(12) United States Patent
Bloom et al.

(10) Patent No.: US 9,175,957 B2
(45) Date of Patent: Nov. 3, 2015

(54) GRAYSCALE PATTERNS FROM BINARY SPATIAL LIGHT MODULATORS

(71) Applicants: David M Bloom, Jackson, WY (US); Matthew A Leone, Jackson, WY (US)

(72) Inventors: David M Bloom, Jackson, WY (US); Matthew A Leone, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 252 days.

(21) Appl. No.: 14/032,459

(22) Filed: Sep. 20, 2013

(65) Prior Publication Data

US 2014/0085562 A1 Mar. 27, 2014

Related U.S. Application Data

(60) Provisional application No. 61/705,000, filed on Sep. 24, 2012.

(51) Int. Cl.

| | |
|---|---|
| G01C 3/08 | (2006.01) |
| F21K 99/00 | (2010.01) |
| H04N 13/02 | (2006.01) |
| G02F 1/133 | (2006.01) |
| G01B 11/25 | (2006.01) |
| G06K 9/20 | (2006.01) |
| G02F 1/155 | (2006.01) |
| G09G 3/34 | (2006.01) |
| G02B 26/08 | (2006.01) |
| G02F 1/01 | (2006.01) |
| G02B 27/00 | (2006.01) |
| G02F 1/29 | (2006.01) |
| G02B 26/10 | (2006.01) |
| G02B 26/06 | (2006.01) |
| G02B 26/02 | (2006.01) |

(52) U.S. Cl.
CPC ... *G01C 3/08* (2013.01); *F21K 9/50* (2013.01); *F21K 9/58* (2013.01); *G01B 11/2527* (2013.01); *G02B 26/0833* (2013.01); *G02B 26/0841* (2013.01); *G02F 1/13306* (2013.01); *G06K 9/2036* (2013.01); *H04N 13/0203* (2013.01); *G02B 26/02* (2013.01); *G02B 26/06* (2013.01); *G02B 26/085* (2013.01); *G02B 26/0808* (2013.01); *G02B 26/0816* (2013.01); *G02B 26/0858* (2013.01); *G02B 26/101* (2013.01); *G02B 27/0068* (2013.01); *G02F 1/0123* (2013.01); *G02F 1/0128* (2013.01); *G02F 1/155* (2013.01); *G02F 1/29* (2013.01); *G09G 3/3433* (2013.01); *G09G 2300/0426* (2013.01); *G09G 2300/0473* (2013.01); *H04N 13/0253* (2013.01)

(58) Field of Classification Search
CPC ..... F21K 9/58; G02F 1/0128; G02B 26/0833; G02B 26/02
See application file for complete search history.

(56) References Cited

U.S. PATENT DOCUMENTS

| | | | | |
|---|---|---|---|---|
| 7,158,280 B2* | 1/2007 | Sandstrom | ............ | G03F 7/2057 |
| | | | | 356/138 |
| RE42,739 E * | 9/2011 | Fortier | ................... | H04N 5/378 |
| | | | | 348/294 |

OTHER PUBLICATIONS

Doherty et al., "Phased Reset Timing for Improved Digital Micromirror Device (DMD) Brightness", Society for Information Display, 1998.
Dudley et al., "Emerging Digital Micromirror Device (DMD) Applications", Society of Photo-Optical Instrumentation Engineers, 2003.

* cited by examiner

*Primary Examiner* — Paisley L Arendt
(74) *Attorney, Agent, or Firm* — NUPAT, LLC; Morrison Ulman

(57) ABSTRACT

Brightness-by-column grayscale and spatial Σ-Δ modulation grayscale allow grayscale patterns to be produced using a binary spatial light modulator as fast as the bright/dark switching speed.

6 Claims, 6 Drawing Sheets

US 9,175,957 B2

GRAYSCALE PATTERNS FROM BINARY SPATIAL LIGHT MODULATORS

RELATED APPLICATIONS

This application claims priority benefit from U.S. 61/705,000, "Structured light systems", filed on Sep. 24, 2012 and incorporated herein by reference.

TECHNICAL FIELD

The disclosure is related to spatial light modulators and structured light systems.

BACKGROUND

Structured light systems project known light patterns onto an object. Surface contours of the object make the patterns appear distorted when viewed with a camera at a vantage point separated from the pattern projector by a baseline distance. Geometrical relationships are used to interpret the distortions to determine the distance from the projector to points on the object. In this way, three dimensional spatial coordinates of the surface of the object may be obtained.

Structured light patterns are often produced by projectors that use Texas Instruments "Digital Micromirror Devices" (DMD) as spatial light modulators. These projectors are said to use "Digital Light Processor" (DLP) technology. Examples of other kinds of micromirror arrays include those made by Reflectivity, Inc., a company that was acquired by Texas Instruments in 2006.

Micromirrors in an array are used to switch pixels in an image on or off. At any instant in time a particular pixel is either fully bright or fully dark. Pixels can be switched between the two states at rates as fast as approximately 10 kHz. DLP projectors achieve the effect of grayscale, or intermediate brightness, by pulse width modulation. Brighter pixels are the result of longer bright operation while darker pixels are the result of shorter bright operation. During a given frame of video information, a gray pixel may be produced by setting a micromirror bright for part of the frame time and dark for the remaining time. Grayscale video frames at rates of approximately 200 Hz may be obtained using pulse width modulation of bright micromirror states.

FIG. 1A is a conceptual diagram of part of a micromirror array producing grayscale via pulse width modulation. Micromirror array 105 is depicted as a 30 by 30 array; however, actual micromirror arrays may be as large as approximately 1000 by 2000 and most micromirror arrays contain at least 50,000 mirrors. FIG. 1A shows different brightness levels from bright to gray to dark at different mirrors. This appearance is obtained on an average basis over one video frame. During the frame time, brighter pixels are obtained by leaving the corresponding mirror in its bright state for longer times than darker pixels. Pulse width modulation of the bright state time determines gray levels during a video frame.

FIG. 1B is a conceptual diagram of a micromirror. Mirror 110 is supported over substrate 115 by post 120. When the mirror is position as at 110 it is said to be in its bright state. The mirror can pivot to a dark state position indicated by dashed line 125. The reflecting surface of a typical mirror measures approximately 10 µm by 10 µm and the angle between the bright and dark states states (i.e. positions 110 and 125) is about 10 degrees. ("Micromirror" is defined as a mirror smaller than 100 µm by 100 µm.) There is no intermediate mirror position that can be maintained between the two stable mirror positions that are illustrated. For this reason, spatial light modulators based on micromirrors are binary digital devices.

In structured light applications it is helpful to project spatial patterns at a rate that is high enough to enable detection techniques that reduce the effects of noise from sources such as the 60 Hz flicker of room lights. The approximately 200 Hz frame rate achievable with DLP projectors does not offer much margin above 60 Hz and other noise sources. Therefore, what are needed are systems and techniques for producing grayscale patterns with binary spatial light modulators at high rates.

DETAILED DESCRIPTION

Systems and techniques described below enable grayscale patterns to be produced with binary digital spatial light modulators at rates as fast as the switching rate between bright and dark states. Methods for doing this are called "brightness-by-column grayscale" and "spatial $\Sigma$-$\Delta$ modulation grayscale". Both methods produce two-dimensional patterns, such as stripes and bars, which vary in only one dimension. These kinds of patterns are useful in structured light systems.

In brightness-by-column grayscale, the relative brightness level of a column in a projected pattern is determined by the fraction of the number of modulator elements in a corresponding column of an array of such elements that are in the bright state. The number of modulator elements in each column of the array determines the grayscale resolution. For example, a column in a micromirror array that has 375 mirrors in the bright state and 625 mirrors in the dark state produces a gray stripe of light with ⅜ the intensity of a bright stripe. In this example 1,000 different gray levels may be produced.

In spatial $\Sigma$-$\Delta$ (sigma-delta) modulation grayscale, a low-spatial-frequency grayscale pattern is encoded by a binary spatial light modulator array as a high-spatial-frequency pattern of bright or dark modulator columns. When the high-spatial-frequency pattern propagates through a spatial low-pass filter, the grayscale pattern appears.

Figure 1:
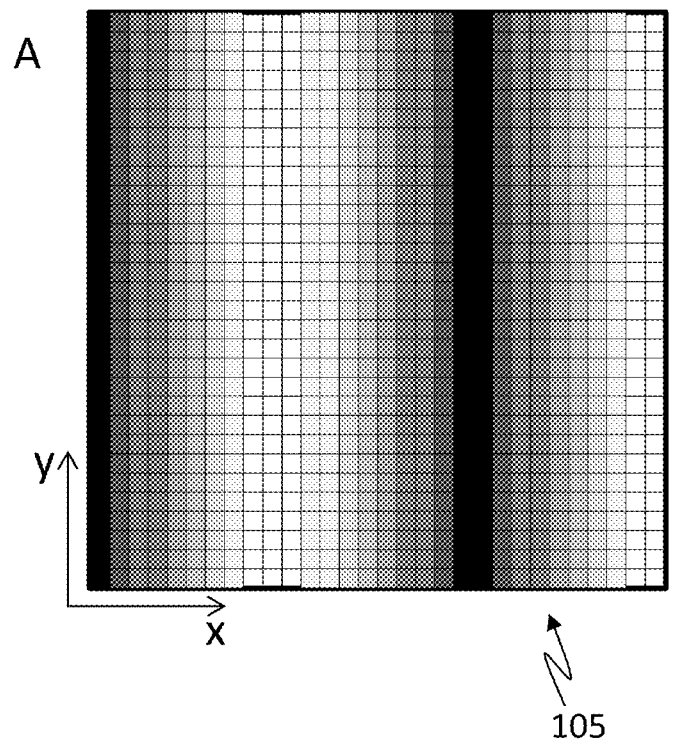
FIG. 1A is a conceptual diagram of part of a micromirror array producing grayscale via pulse width modulation.
FIG. 1B is a conceptual diagram of a micromirror.
Figure 1:
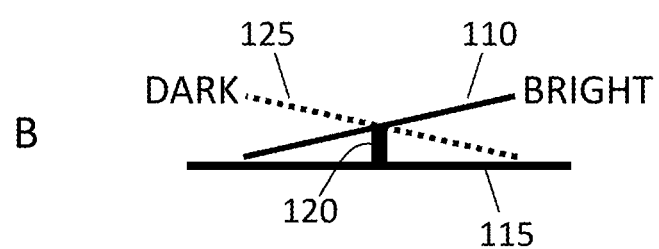
Figure 2:
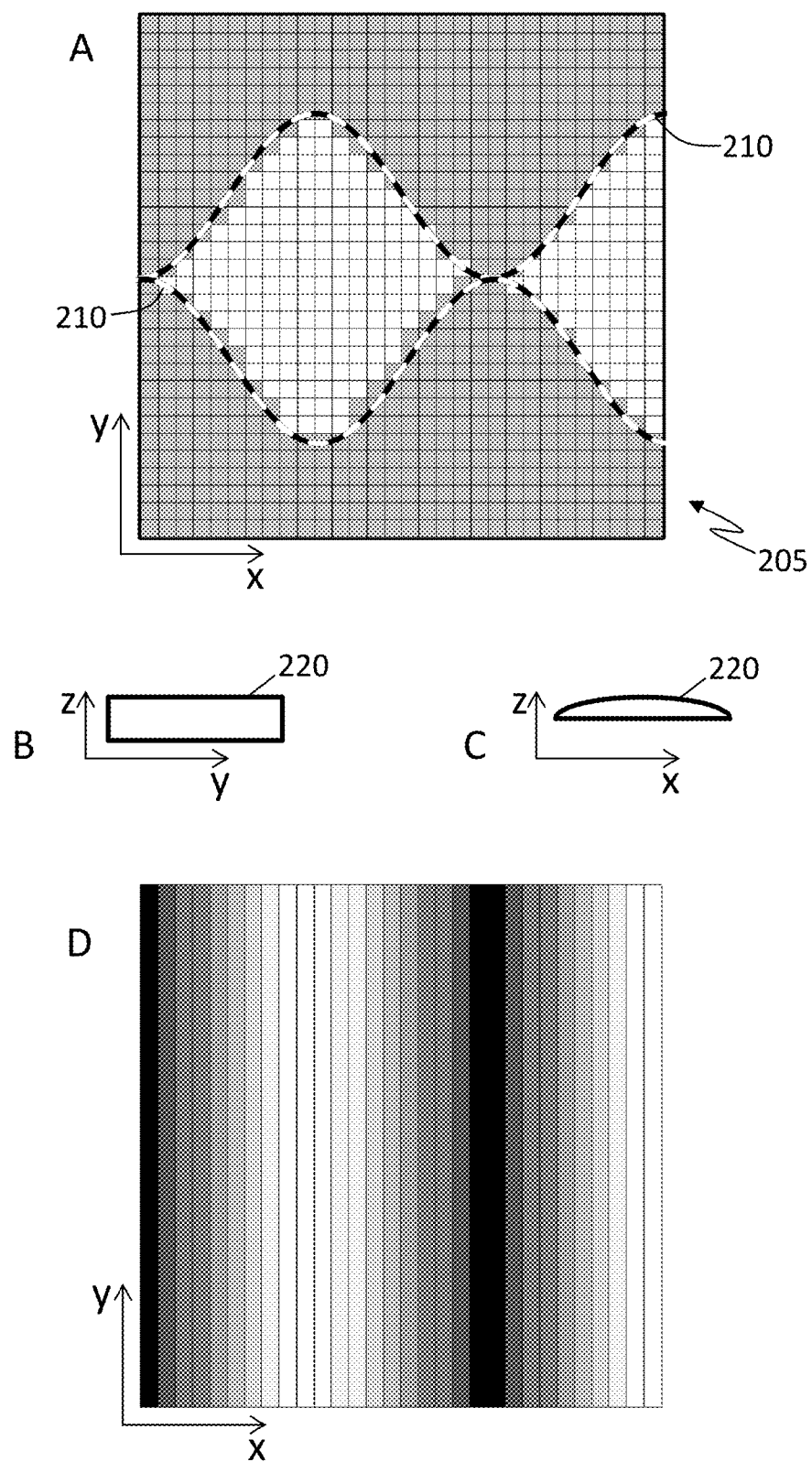
FIG. 2A is a conceptual diagram of part of a micromirror array producing brightness-by-column grayscale.
FIG. 2B is a first view of a cylindrical lens.
FIG. 2C is a second view of a cylindrical lens.
FIG. 2D shows a two-dimensional pattern having variation in only one dimension.

FIG. 2A is a conceptual diagram of part of a micromirror array producing brightness-by-column grayscale. Micromirror array 205 is depicted as a 30 by 30 array; however, actual micromirror arrays may be as large as approximately 1000 by 2000. FIG. 2A shows only two different brightness levels—bright and dark—at different mirrors. Binary patterns such as the bright/dark pattern of array 205 can be produced by a DLP projector as fast as approximately 10 kHz.

Sinusoidal envelope 210 is drawn in FIG. 2A for pedagogical reasons to emphasize that the number of bright mirrors in each column of array 205 is a sinusoidal function of position along the x-axis. However, brightness-by-column grayscale may be used to create patterns with arbitrary variation in one dimension, not necessarily sinusoidal. (In the figures, columns are groups of mirrors or pixels all having the same x-coordinate, while rows are groups of mirrors or pixels all having the same y-coordinate.)

When the mirror pattern of FIG. 2A is imaged by a cylindrical lens, the image shown in FIG. 2D is obtained. FIGS. 2B and 2C are views of a cylindrical lens that are provided to show the orientation of the lens with respect to the mirror pattern of FIG. 2A. The right-handed coordinate axes provided in each figure are consistent and meant to aid orientation between figures. Cylindrical lens 220 shown in FIGS. 2B and 2C focuses along the x-axis, perpendicular to columns of the array, but has no effect along the y-axis. The lens creates an image in which x-axis brightness variations along the mirror array are preserved while y-axis brightness variations are blended according to unfocused propagation from the array to the far field. The resulting image, as shown in FIG. 2D, is two-dimensional, but has brightness variations in only one dimension, along the x-axis. The brightness varies sinusoidally in the x direction in proportion to the number bright pixels in each column of array 205.

Figure 3:
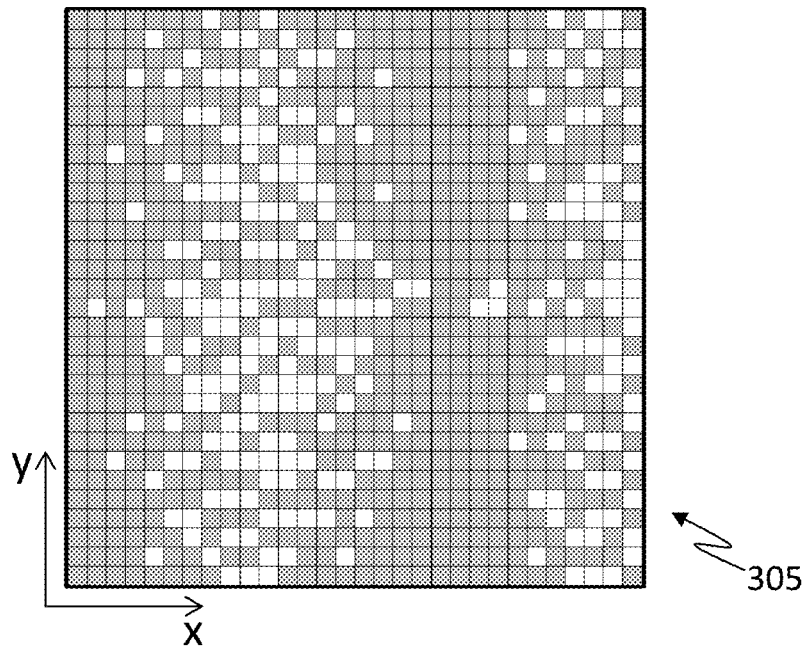
FIG. 3 is conceptual diagram of part of a micromirror array producing brightness-by-column grayscale.

With ideal illumination and ideal optics, the distribution of bright and dark pixels in any particular column of array 205 in FIG. 2A does not affect the appearance of the image shown in FIG. 2D. The bright pixels might be arranged according to a bar chart of desired grayscale intensity, for example. However, in practical systems it is helpful to distribute bright pixels along each column approximately uniformly. FIG. 3 is conceptual diagram of part of a micromirror array producing brightness-by-column grayscale where the bright pixels are distributed along each column randomly. In FIG. 3, array 305 is same as array 205 except that different mirrors are in the bright state. Each column of array 305 has the same number of bright state mirrors as the corresponding column of array 205. In array 305, however, the bright state mirrors are randomly distributed along the column. The approximately uniform distribution of bright state mirrors along the columns is a more robust arrangement than the distribution of FIG. 2A. When the array of FIG. 3 is imaged with a cylindrical lens oriented according to FIGS. 2B and 2C, the result is the image shown in FIG. 2D.

Figure 4:
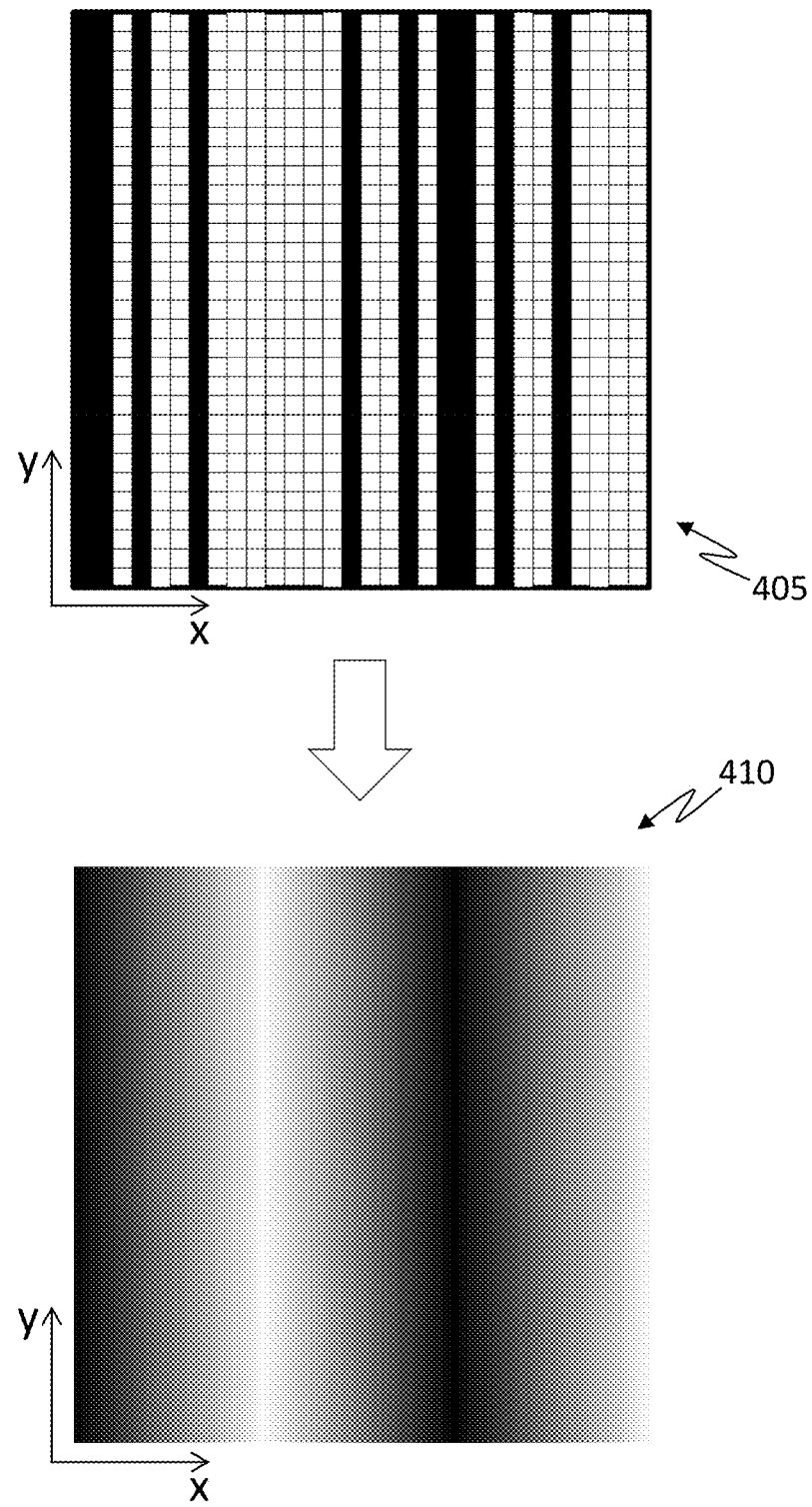
FIG. 4 is conceptual diagram of part of a micromirror array producing grayscale via spatial $\Sigma$-$\Delta$ modulation.

Spatial Σ-Δ modulation grayscale is another way to produce grayscale patterns with a binary spatial light modulator at rates as fast as the switching rate between bright and dark states. FIG. 4 is conceptual diagram of part of a micromirror array producing grayscale via spatial Σ-Δ modulation. In FIG. 4, array 405 is the same as arrays 205 and 305 except that different mirrors are in the bright state. In array 405 each column of mirrors is either all bright or all dark. The spatial density of bright and dark columns along the x-axis is analogous to the temporal density of pulses in a Σ-Δ modulation scheme; hence the term "spatial Σ-Δ modulation". The abrupt transitions from bright to dark contain high-spatial frequency components that are removed when light modulated by the mirror array propagates through a spatial low-pass filter. The resulting image is shown at 410; note that brightness variations along the x-axis are smooth.

Figure 5:
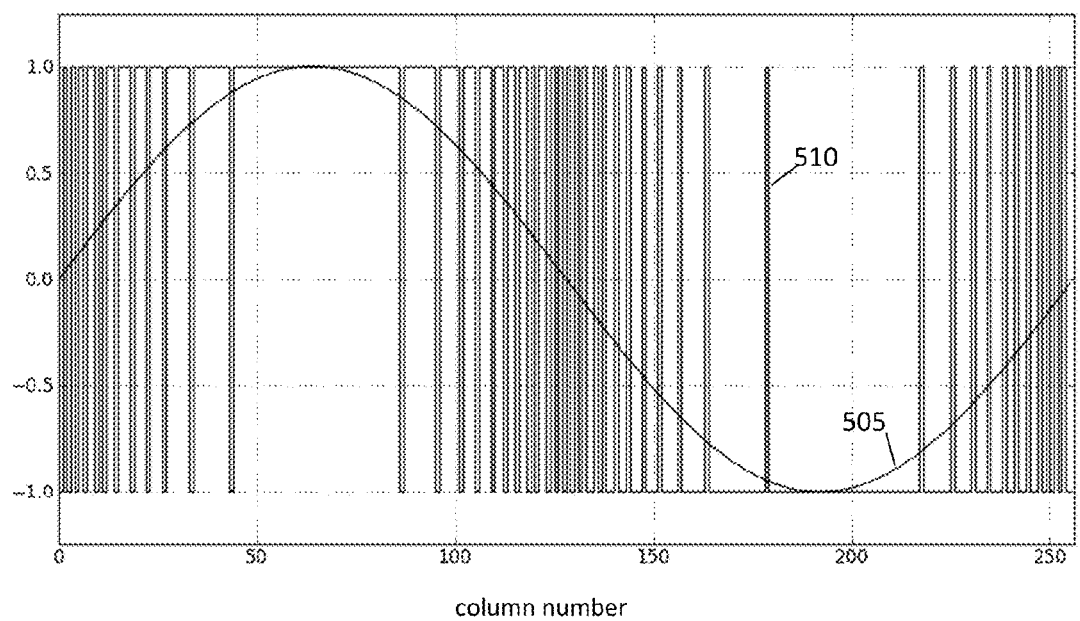
FIG. 5 shows graphs pertinent to spatial $\Sigma$-$\Delta$ encoding of a grayscale pattern.

The bright/dark column pattern needed to produce a desired grayscale pattern may be found using a Σ-Δ modulation algorithm. FIG. 5 shows graphs pertinent to spatial Σ-Δ encoding of a sinusoidal grayscale pattern as an example. Graph 505 in FIG. 5 is a slowly varying sinusoidal function that represents desired brightness as a function of x-coordinate. The desired brightness varies smoothly from full dark to full bright. Graph 510 shows the column-by-column mirror state required to produce the sinusoidal brightness represented by graph 505. Here, +1 corresponds to a column of all bright state mirrors while −1 corresponds to a column of all dark state mirrors.

In analogy to a low-pass filter removing high-frequency components of a temporal pulse train leaving an analog, low-frequency signal in a conventional Σ-Δ modulation scheme, a spatial low-pass filter removes high-spatial-frequency components of a spatial bright/dark column pattern leaving a grayscale, low-spatial-frequency pattern in a spatial Σ-Δ modulation scheme.

Figure 6:
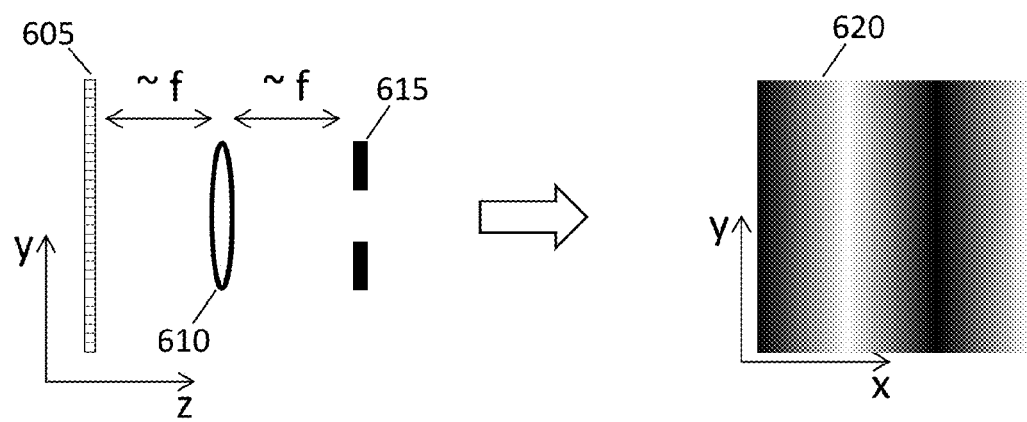
FIG. 6 is a conceptual block diagram of a system to produce grayscale via spatial $\Sigma$-$\Delta$ modulation.

FIG. 6 is a conceptual block diagram of a system to produce grayscale via spatial Σ-Δ modulation and using a spatial low-pass filter. In FIG. 6, array 605 is just array 405 viewed from the side. (The y-z axes near array 605 may be considered to be part of a right-handed coordinate system whose x-y axes are shown near array 405.) Lens 610 has focal length f and is placed approximately f away from array 605. Aperture 615 is placed in the Fourier plane of lens 610; i.e. approximately f away from the lens on the opposite side from the array. Aperture 615 blocks high spatial frequency components from appearing in an image of array 605. The image, after propagation through a projection system (not shown), and rotated about the y-axis for easier depiction on a flat page, is shown at 620. In image 620, brightness variations along the x-axis are smooth.

Brightness-by-column grayscale and spatial Σ-Δ modulation grayscale share the common characteristics that patterns of only bright and dark modulator elements may be used to create grayscale images. Such patterns can be changed at the bright/dark switching speed which is approximately 10 kHz for a DLP projector and is much faster than the conventional pulse width modulated grayscale frame rate. The images are two-dimensional, but have brightness variations along only one dimension.

Another binary spatial light modulator technology that is suitable for brightness-by-column grayscale and spatial Σ-Δ modulation grayscale is ferroelectric liquid crystal on silicon (FLCOS). At any particular instant, each pixel in an FLCOS device is in one of only two states: BRIGHT or DARK. FLCOS modulator elements can switch between these two states at about 10 kHz. Thus all of the examples presented above for micromirror arrays are equally applicable to spatial light modulators having arrays of FLCOS elements.

Furthermore brightness-by-column grayscale and spatial Σ-Δ modulation grayscale may even be used with spatial light modulators that are based on analog elements such as liquid crystal displays (LCD) and liquid crystal on silicon (LCOS) arrays. (LCOS is not the same as FLCOS; LCOS is based on nematic liquid crystals.) Although LCD and LCOS technologies can produce grayscale directly from analog voltage inputs, operation with binary inputs may be attractive in some situations. First, producing grayscale from only "one-bit", i.e. on or off, digital signals means that modulator driver circuits may be greatly simplified. High-precision digital-to-analog converters are no longer needed. Second, driver data requirements are reduced. As an example, a 1024×2048 modulator in which each pixel requires 10-bits of grayscale resolution needs approximately 20 megabits of data every frame. The same modulator can produce 10-bits of grayscale using brightness-by-column grayscale with only about 2 megabits of data.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for producing a grayscale image comprising:
   providing a digital spatial light modulator having a two-dimensional array of modulator elements each of which may be set in a bright state or a dark state, the elements arranged in columns;
   setting columns of elements in the array in bright or dark states according to spatial $\Sigma$-$\Delta$ modulation of a desired grayscale pattern; and,
   imaging the array with a lens and an aperture to produce the desired pattern, the aperture removing high spatial-frequency components from the pattern.

2. The method of claim 1, the lens having a Fourier plane and the aperture placed in the Fourier plane.

3. The method of claim 1, the modulator elements being micromirrors.

4. The method of claim 3, the array comprising at least 50,000 micromirrors.

5. The method of claim 1, the modulator elements being ferroelectric liquid crystal on silicon.

6. The method of claim 1, the elements being capable of switching between bright and dark states at 10 kHz or faster.

* * * * *